Jan. 24, 1967  A. L. BAPTIE ETAL  3,299,776
MACHINE FOR ENLARGING OF PRINTED MICROPHOTOGRAPHS
Filed Nov. 2, 1964  8 Sheets-Sheet 1

Fig.1.

Inventors:
Alexander L. Baptie
Lyle G. Miles
By
Bair, Freeman & Molinare
Attys.

Jan. 24, 1967  A. L. BAPTIE ETAL  3,299,776
MACHINE FOR ENLARGING OF PRINTED MICROPHOTOGRAPHS
Filed Nov. 2, 1964  8 Sheets-Sheet 7

Inventors:
Alexander L. Baptie
Lyle G. Miles
By
Attys.

United States Patent Office 3,299,776
Patented Jan. 24, 1967

---

3,299,776
MACHINE FOR ENLARGING OF PRINTED MICROPHOTOGRAPHS
Alexander L. Baptie, La Crosse, and Lyle G. Miles, West Salem, Wis., assignors to The Microcard Corporation, a corporation of Wisconsin
Filed Nov. 2, 1964, Ser. No. 408,287
7 Claims. (Cl. 88—24)

This application is a continuation-in-part of our copending application Serial No. 322,707, filed November 12, 1963, and entitled, Microphotographic Apparatus, now U.S. Patent No. 3,261,259, issued July 19, 1966.

This invention relates to microphotographic apparatus and, more particularly, to an improved microphotographic machine for enlarging and printing out images from a microphotograph or microfiche.

The proper maintenance and storage of important business records, documents, books and the like is a problem facing a broad spectrum of the business community. In some localities, industrial concerns are building, renting or leasing warehouse space solely to store their records and the like. Libraries are hard-pressed to house the ever expanding volume of new publications.

An important solution to this problem has been to photograph copy in reduced size on a microfiche or negative and then to read the microfiche by utilizing a special microphotographic viewer. An entire magazine may be photographed on two or three small microfiches on the order of three inches by five inches.

It is often desired to make an enlarged copy of one or more frames of a microfiche. Enlargement of the entire microfiche on equipment ordinarily used results in a permanent enlargement which is of a relatively small size and cannot be easily read without the aid of magnification. It is preferable that equipment be provided which will enlarge each frame of the microfiche and provide a substantially enlarged image on print paper, which may be subsequently procesesd in a known manner. As the frames are precisely positioned on the microfiche, the enlarging machine must be precisely made so it can clearly and sharply print out the desired frames onto the paper, which will provide an enlarged record of a frame on the microfiche.

Thus, an important object of the present invention is to provide an improved automatic photographic apparatus for enlarging and printing images from a microphotograph or microfiche in a predetermined sequence.

Another object of the present invention is to provide a novel step and repeat enlarging and printing apparatus adapted to be utilized with microfiches, such apparatus including a carriage supporting a microfiche and being movable in a predetermined manner both longitudinally and transversely with respect to a strip of sensitized paper to produce a plurality of enlarged frames on said strip of sensitized paper from said microfiche.

Further object and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which like numerals refer to like parts, and in which.

Figure 1:
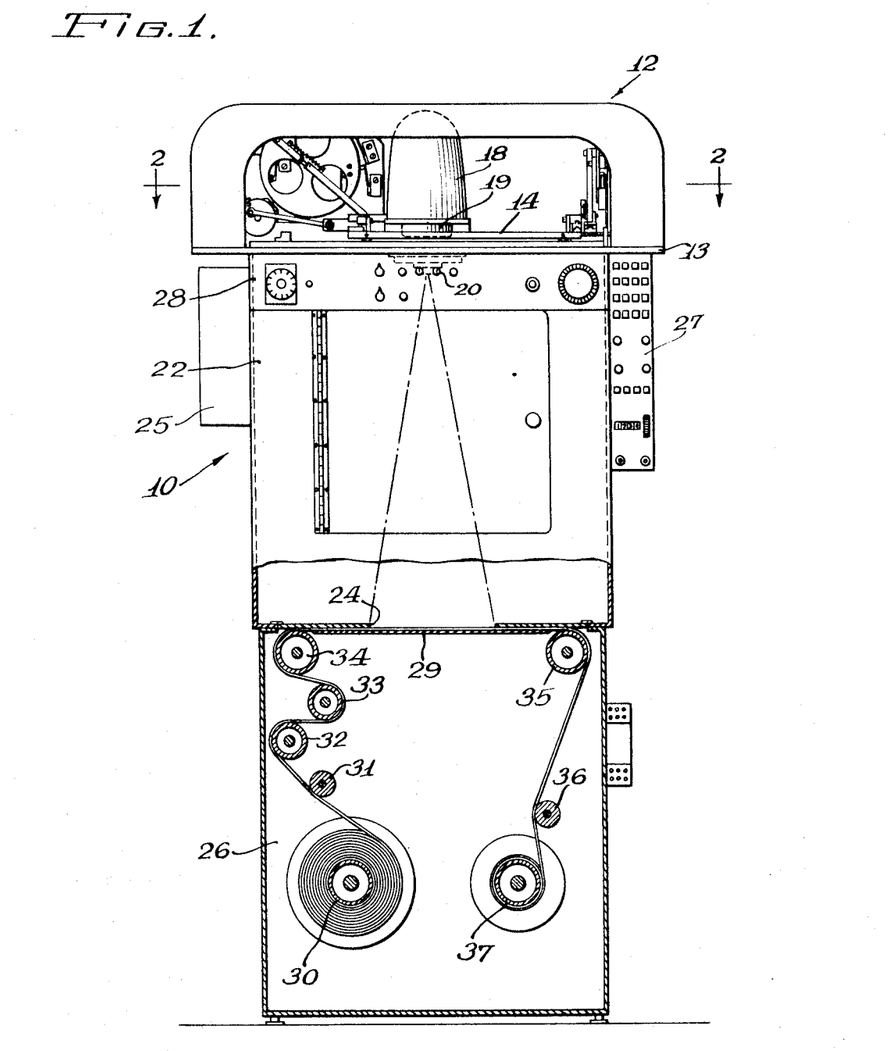
FIGURE 1 is a front elevation view with parts broken away of a microphotographic enlarging apparatus embodying the present invention.

Referring to FIGURE 1, there is illustrated the microphotographic enlarging device of the present invention. Carried on the frame means 10 is a step and repeat enlarging mechanism 12.

Figure 2:
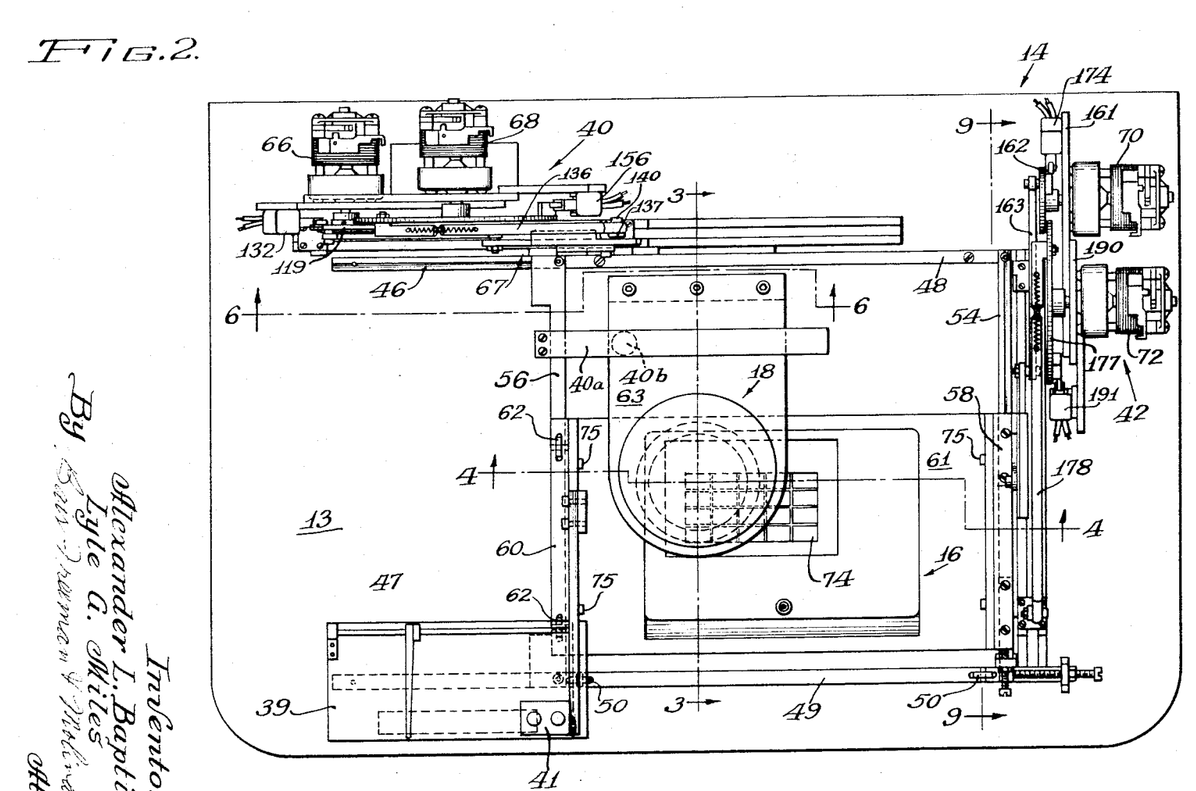
FIGURE 2 is a cross-sectional view taken generally along the line 2—2 of FIGURE 1, and more clearly illustrating the carriage means for moving the microfiche both longitudinally and transversely with respect to the sensitized paper upon which the enlarged images are to be printed.
Figure 3:
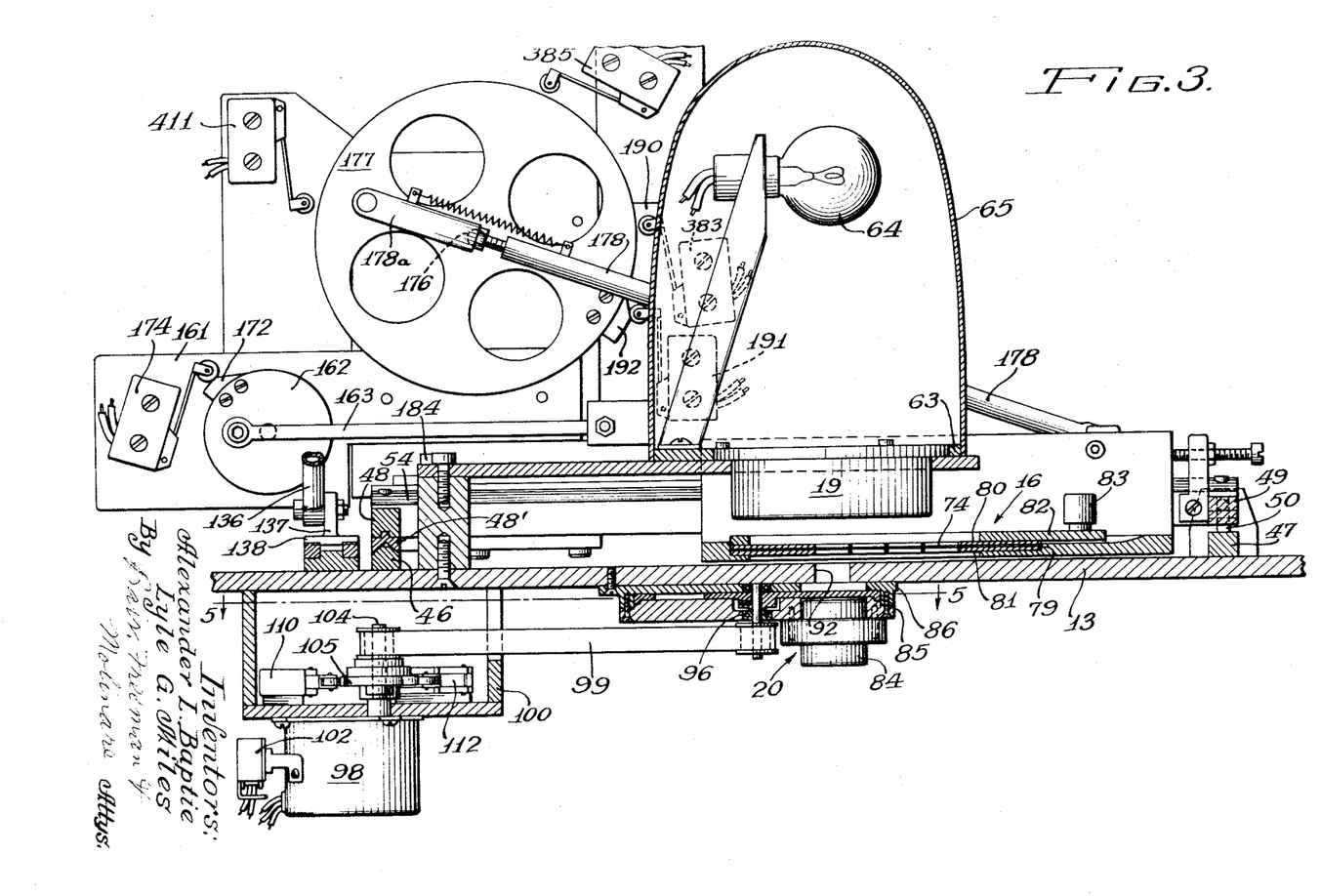
FIGURE 3 is a cross-sectional view on an enlarged scale of the step and repeat microphotographic enlarging mechanism taken generally along the line 3—3 of FIGURE 2.
Figures 4, 5:
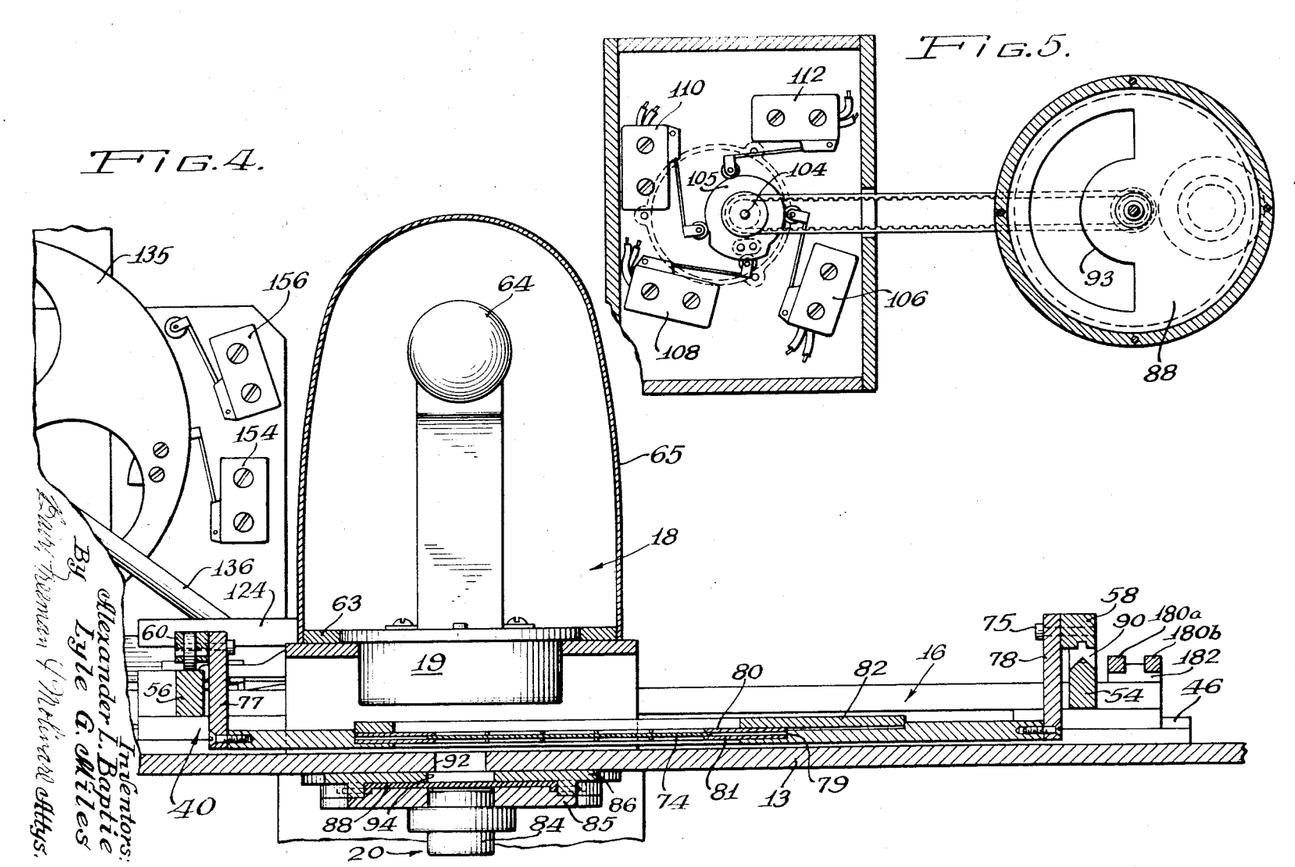
FIGURE 4 is a cross-sectional view on an enlarged scale of the step and repeat microphotographic enlarging mechanism taken generally along the line 4—4 of FIGURE 2.
FIGURE 5 is a cross-sectional view taken generally along the line 5—5 of FIGURE 3, and more clearly illustrating the shutter drive mechanism.

The step and repeat enlarging mechanism 12 of this invention comprises a base member 13 upon which is supported carriage means 14 adapted to carry therewith a fiche support means 16 (best seen in FIGURES 2, 3 and 4). Fixedly carried on the base 13 of the step and repeat enlarging mechanism 12 is a print lamp means 18 comprising a lamp and a concentrating lens 19 for concentrating the light on the area or frame on the microfiche to be exposed. As will be more apparent hereafter, the microfiche or negative is supported between the print lamp means 18 and an opening in the base 13. Depending from the base 13 beneath the opening is an enlarging lens mechanism 20 for enlarging the frame on the microfiche.

The frame means comprise an upper cabinet 22 having an open top, which is adapted to be closed by the base 13, and an opening 24 in the bottom thereof, and a lower cabinet 26 which has an open top at least as large as opening 24 in the bottom of the upper cabinet 22. The lower cabinet 26 is adapted to contain the roll of sensitized paper upon which the enlargements are to be exposed. It will be noted that the roll 29 of sensitized paper is carried on a supply roll 30 and is adapted to be trained over a plurality of rollers 31, 32, 33, 34, 35 and 36 and to be taken up on a driven take-up roller 37.

Control panels 27 and 28 are suitably carried on the upper cabinet 22 for indicating the control sequence of the step and repeat enlarging mechanism. Also supported on cabinet 22 is splice detector 25. The function of the controls and splice detector will be fully explained hereinafter.

The lens mechanism 20 of the step and repeat enlarging mechanism of this invention is fixed in a horizontal plane with respect to the plane of the paper 29 upon which the images are to be exposed. Preferably, the lens mechanism 20 is mounted on the base 13 of the step and repeat enlarging mechanism 12 at a predetermined fixed focal distance from the surface of the paper and functions to enlarge a selected image of the fiche projected onto the sensitized paper beneath opening 24.

Referring to FIGURE 2, there is illustrated a plan view of the step and repeat enlarging mechanism 12 with the cover removed to better illustrate the carriage structure for actuating the microfiche holder so as to sequentially produce a plurality of sharp and clear enlarged images on the strip of sensitized paper 29. Carried on the base 13 is a holder 39 for a program folder. Supported on the carriage structure are photocells 41 for controlling the programming of the apparatus responsive to a predetermined program folder carried on holder 39.

The carriage structure includes a frame advance and return carriage 40 for moving the microfiche support means 16 longitudinally with respect to the orifice opening in base 13 and the surface of the sensitized paper 29 upon which the enlargement are to be exposed, and a line advance and return carriage means 42 for moving the microfiche support means transversely with respect to the aperture opening in the base 13. It is seen that the carriage means 40 and 42 move in planes which are parallel to the working surface of the paper, such working surface being supported in a substantially horizontal plane by the rollers 34 and 35 in the lower cabinet 26 of the frame means 10. Thus, the support or holder means 16 is supported for movement in a plane parallel to the working surface of the paper.

The carriage means 40 are supported and guided upon the frame or base 13 of the step and repeat enlarging mechanism for movement in a plane parallel to the plane of the working surface of paper 29 adjacent the opening 24 in cabinet 22 by means including a guide track 46 and a roller track 47. The carriage means comprises a slide rail 48 movable along guide track 46 affixed to base 13, a roller rail 49 journaling rollers 50 which are in engagement with and movable along roller track 47, a guide track 54 and a roller track 56. In plan view, the members of the carriage means 40 define a right parallelogram.

Supported upon the first carriage means 40 for movement transversely of the base 13 is a second carriage means 42 which is adapted to support the microfiche or negative support means 16 thereon. Carriage means 42 comprises a slide rail 58 operatively engaging guide track 54 on carriage means 40 and a roller rail 60 journaling a plurality of rollers 62 which are in engagement with and movable along roller track 56 of carriage 40. The ends of base plate or panel 61 (upon which microfiche or negative supporting means 16 are supported) is connected to the slide rail 58 and the roller rail 60 of the carriage means 42. Thus, the base plate 61 functions to interconnect the rails 58 and 60 and complete the carriage 42.

Power means are provided for effecting a predetermined sequential movement of each of the carriage means. The power drive for the first carriage means 40 includes a frame advance or longitudinal advance drive motor 66 operatively connected to the first carriage means by pawl and ratchet drive means 67. Frame return drive motor 68 is operatively connected to the rail 48 for moving carriage means 40 in a reverse direction and for returning the first carriage means to its starting position at the end of a predetermined sequence of operation.

The drive means for the second carriage means 42 includes a line advance or transverse drive motor 70 operatively connected to the second carriage means by a pawl and ratchet mechanism 71 and a line return or transverse return drive motor 72 operatively connected to the rail 58 for returning the second carriage means 42 to its starting position at the conclusion of a predetermined cycle of operation.

As seen in FIGURES 3 and 4, the print lamp means or light source 18 comprises a base plate 63, which is adapted to be affixed to the base 13, a print lamp 64 carried on a bracket mounted from the base plate 63 and disposed in alignment with an aperture opening in base 13, and a double condenser lens set 19 for condensing the light from the print lamp 64 and concentrating the rays on the frame of the microfiche to be enlarged. A suitable cover or hood 65 encloses the print lamp.

The negative or microfiche 74 is supported for movement in a plane by support means 16 which comprises a base 61 affixed at its ends to plates 77 and 78 which are in turn affixed to the rails 58 and 60, respectively, by suitable fastening means 75. The microfiche 74 is supported in a frame comprised of planar grid-like sections 80 and 81 which are held in position in the opening 79 in the base 61 of the support means 16 by suitable means including a hold-down plate 82 affixed to the base 61 by a hold-down bolt 83.

The microfiche is adapted to be supported between the print lamp means 18 and the enlarging lens mechanism 20 affixed to the bottom of base 13. The microfiche holder 16 will be moved in a predetermined orderly sequence so that the individual frames on the microfiche may be enlarged on the sheet of sensitive paper 29.

The lens mechanism 20 comprises a lens 84 supported on a frame 85. Frame 85 is in turn connected to frame 86, which is affixed to frame structure or base plate 13. Movable shutter 88 is supported between frames 85 and 86. As aforenoted, the film holder 16 of the step and repeat enlarging mechanism is movable longitudinally and transversely on the base 13 with respect to the lens and shutter mechanism 20, which is fixedly carried on the bottom of base 13 at a predetermined focal distance from the working plane of the paper 29 upon which the images to be enlarged are exposed.

Referring again to FIGURE 4, there is illustrated the manner of supporting the microfiche support member on the carriage structure. As aforenoted, the first carriage means 40 is supported for movement on the frame 13 along a guide track 46 and a roller track 47. The roller rail 49 of carriage 40 journals rollers 50, which support the rail for movement along the roller track 47. The carriage means 40 also includes a pair of transversely disposed members 54 and 56.

Affixed to one side of the microfiche support means 16 is a roller rail 60 which journals thereon a pair of rollers 62. These rollers 62 are adapted to engage and move along the top of the roller track 56 on the first carriage means 40.

The other side of the plate 61 of the microfiche support means 16 is affixed to slide rail 58, which has a bearing block 90 fixedly connected to the bottom thereof. The bearing block 90, which is preferably made of bronze, engages and slides along the V-shaped surface of guide track 54 carried on the first carriage means 40. It is noted that the block 90 is provided with a recess complementary to the configuration of the top of guide track 54. From the foregoing, it is evident that the microfiche holder 16 is carried with the second carriage means 42 for movement transversely of the surface of the sensitized paper upon which the enlargement is to be exposed. The second carriage means 42 is operatively supported and guided on the first carriage means 42 for movement longitudinally of the surface of the print paper 29.

Referring to FIGURE 3, there is illustrated the relationship between the microfiche 74 and the enlarging lens mechanism 20, as well as the shutter drive mechanism. The microfiche holder 16 may be moved to selectively position the first frame to be enlarged over the aperture 92 in the base 13. The lens mechanism 20 is affixed to the base 13 at a predetermined distance from the effective working surface of the print paper 29 contained in cabinet 26. Movable shutter 88 within the lens mechanism 20 regulates the exposure of the frame to the print paper. Provided in the shutter 88 which is rotatably supported between the frames 85 and 86 is a shutter opening 93. The shutter opening 93 is adapted to be moved into alignment with an opening 94 in the frame 86 and aperture 92 in base 13. The individual frames on microfiche 74 is retained by the microfiche holder 16 wil be sequentially exposed to the print paper by virtue of the periodic operation of the rotary shutter mechanism 88 which is journaled in bearings 96 supported in the frames 85 and 86.

The means for driving the shutter 88 comprises a shutter drive motor 98 operatively connected to the shutter 88 by means of a belt and pulley drive 99. The shutter drive motor 98 depends from a housing 100 affixed to the frame structure 13. Carried on the casing of the shutter drive motor 98 and electrically connected in circuit with the shutter drive motor 98 is a relay 102 which functions as a clutch for controlling actuation of the motor 98. The operation of this relay mechanism will be more full explained hereinafter.

Operatively connected to the motor shaft 104 and adapted to be driven therewith is a cam 105 which is adapted to sequentially operate a plurality of electrical switches. As best seen in FIGURE 5, the cam 105 will actuate a series of four switches. Switch 106, which is adapted to be actuated by a lug carried on cam 105, functions to terminate the operation of the shutter drive motor 98 at the end of each cycle of operation (at the end of one revolution of shutter 88). The switch 108, which engages the peripheral edge of cam 105, is adapted to start the frame advance motor 66, except at the end of a line or at the end of the negative. The switch 110, which also engages the peripheral edge of cam 105, is closed just after exposure is complete to operate the paper advance solenoid in the electrical circuit. The switch 112, which is also actuated from the peripheral edge of cam 105, is adapted to start the frame return motor after the last exposure of a given line.

In FIGURES 2, 6, 7 and 8, there is illustrated the means for actuating the first carriage means 40 in a predetermined path with respect to the print paper. The first carriage means 40 is supported for movement on the base plate 13 along the guide track 46 and the roller track 47. The shaft 116 of the frame advance motor 66 extends through an opening in the motor support bracket 118 and has affixed on the end thereof a drive cam 119. The drive cam 119 is operatively connected to a slide 120 by means of a crank arm 121. One end of crank arm 121 is pivotally connected to cam 119 as indicated at 122, and the other end of the crank arm is pivotally connected to slide 120 as indicated at 123. Slide 120 is supported for reciprocal movement within the slide support 124. Pawl 125, which is carried on a pivot 126 affixed to the slide 120, is adapted to engage teeth 128 on the rack 129 which is affixed to slide rail 48. During the first one-half revolution of the frame advance cam 119, the slide 120 will be moved to the right as viewed in FIGURE 6, and pawl 125 will move upwardly over a tooth 128 on the rack 129. During the second half revolution of cam 119, pawl 125 will engage the face of the next tooth 128 and advance the rack to the left as viewed in FIGURE 6. In this manner, the carriage means 40 will be advanced incrementally or indexed.

Figures 6, 7, 8:
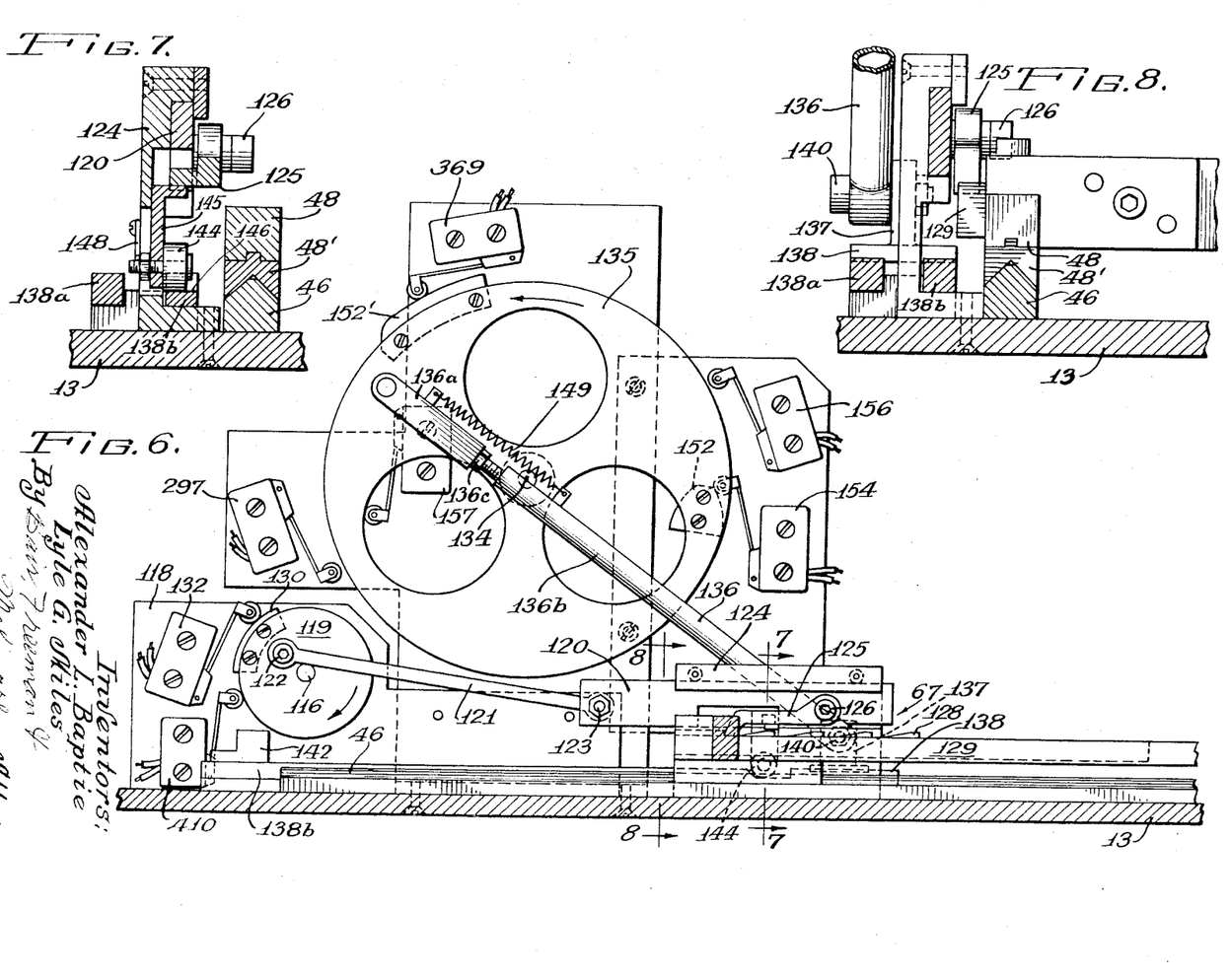
FIGURE 6 is a cross-sectional view of the carriage means of the step and repeat enlarging mechanism taken generally along the line 6—6 of FIGURE 2, more clearly showing the frame advance and return mechanism of the present invention.
FIGURE 7 is a cross-sectional view of the carriage means taken generally along the line 7—7 of FIGURE 6.
FIGURE 8 is a cross-sectional view of the carriage means taken generally along the line 8—8 of FIGURE 6.

At the conclusion of each revolution of the frame advance cam 119, the lug 130 on the cam will engage an arm of switch 132, thereby interrupting the electrical circuit to the frame advance motor 66, and stopping the frame advance motor. Lug 130 engages an arm of switch 410 for controlling the electric brake mechanism to stop the holder carriage 42 at the end of each frame advance.

The brake shown schematically in FIGURE 2 comprises a flat steel strip 40$^a$ movable with the frame advance carriage 40 and a coil and brake lining assembly 40$^b$ which is held stationary on base 13. When the coil is energized, the brake is actuated to stop the carriage 40. The electrical supply for the brake is a full wave bridge rectifier with a series dropping resistor in the direct current line to the brake.

At the conclusion of a predetermined advance along a line (in the illustrative embodiment, at the end of the fifth increment of advance), the frame return drive motor 68 will be actuated. Upon energization of the frame return drive motor 68, the drive motor shaft 134 will rotate as will the large cam wheel 135 fixed thereto. The reset crank arm 136, which is pivotally affixed at one end to the cam wheel 135 and at the other end to a projection 137 extending upwardly from the reset slide 138, will actuate the reset slide to the right as viewed in FIGURE 6. The reset crank arm 136 is pivotally affixed to the arm projection 137 by a swivel pivot means 140. Upon movement of the reset slide to the right as viewed in FIGURE 6 the reset lug 142 which extends upwardly from reset slide 138 will engage the face of the rack 129 and cause the rack and the rail 48 affixed thereto to be moved to its starting position. The carriage 40 is thereby repositioned at the beginning of a line.

At the same time that the reset slide 138 is moved to the right, as viewed in FIGURE 6, the roller 144 journaled on the pawl lift member 145 rides out of the recess 146 in the reset slide 138 and onto the top surface of the reset slide. The pawl lift member 145 is raised and the pawl 125 is pivoted out of engagement with teeth 128 on rack 129. The pawl lift member 145 is ordinarily biased downwardly by a spring 148.

As best seen in FIGURES 2, 7 and 8, the reset slide 138 comprises a pair of bar members 138$^a$ and 138$^b$ operatively connected together adjacent one end by the arm member 138 and adjacent the other end by reset lug 142.

Affixed beneath and movable with slide rail 48 is a bearing block 48′. The block 48′, which is preferably made from bronze, has a V-shaped recess therein, which is complementary to the configuration of the top of guide track 46.

It is to be noted that the reset crank arm 136 is comprised of arm members 136$^a$ and 136$^b$ interconnected by adjustable telescoping joint 136$^c$. Spring member 149 biases the arm members 136$^a$ and 136$^b$ of the crank arm 136 toward one another to maintain the arms in operative relationship.

Carried on the cam wheel 135 is a lug 152, the exterior cam surface of which is adapted to sequentially engage an arm of the switch 154 for terminating operation of the frame return motor 68 at the end of a single revolution of shaft 134. Lug 152 has an interior cam surface for engaging an arm of switch 157 to open the circuit to the frame return motor and stop the motor in locked position at the end of a negative. Switch 157 is shorted-out except at the end of a negative. Cam lug 152′ operates switches 156, 369 and 297. Switch 156 starts shutter operation at the start of a line. Switch 369 prevents the shutter from starting while the frame return motor is running until the shutter is started by switch 156. Switch 297 starts the line advance motor 72 except at the end of a negative. The operation of the electrical switches will be more fully explained hereinafter.

Referring now to FIGURES 2, 3, 9 and 10, there is shown the means for driving the carriage means 42 transversely on the carriage means 40. The shaft 160 of the line advance motor 70 extends through an opening in the line advance motor support bracket 161. Fixed to the end of shaft 160 is a cam 162. A crank arm 163 is pivotally connected at one end to the cam 162, and at the other end, the crank arm is pivotally connected to a slide 164. The slide 164 is guided for movement in a slide support 165. Pivotally connected on pivot 166 on the slide 164 is a pawl member 167. The pawl 167 is adapted to engage teeth 169 on the rack 170. As rack 170 is fixed to one end of the microfiche holder 16, movement of the rack will cause movement of the holder 16 incrementally in a path transversely of the second carriage 42 along the guide track 54 of the second carriage.

Figure 9:
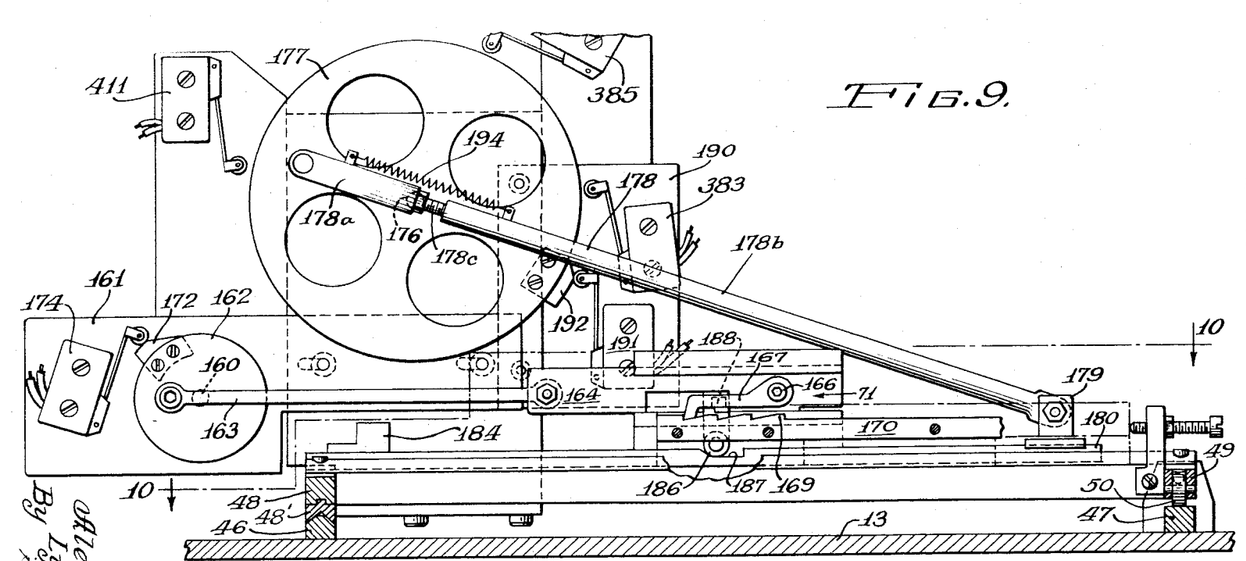
FIGURE 9 is a cross-sectional view of the carriage means taken generally along the line 9—9 of FIGURE 2, more clearly showing the line advance and return mechanism of the present invention.
Figure 10:
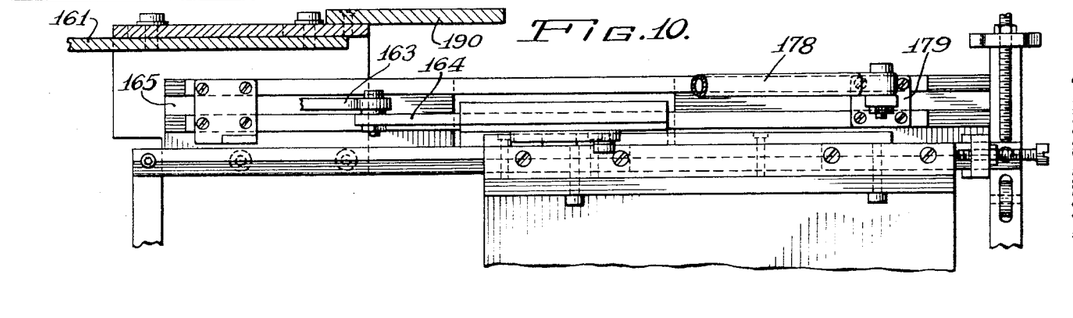
FIGURE 10 is a cross-sectional view taken generally along the line 10—10 of FIGURE 9, more clearly illustrating the guide track for the line advance and return mechanism.

At the end of each revolution of the line advance motor 70, the lug 172 on the cam 162 will engage an arm of the switch 174 and terminate the operation of the line advance motor.

It will be noted that in the illustrated embodiment of the invention, four teeth 169 are provided on rack 170. Thus, the carriage 42 may be moved to expose four separate lines of frames on the panel of film. After four lines or rows of frames have been exposed on the desired section of film, the line return motor 72 is energized. Upon energization of the line return drive motor 72, the shaft 176 thereof is rotated. Cam wheel 177 fixed to shaft 176 will also rotate. A crank arm 178 is pivotally connected at one end to cam wheel 177. The other end of crank arm 178 is pivotally joined to arm 179 which extends upwardly from the reset slide 180. The reset slide 180 engages with and is movable along the guide track 182 (FIGURE 4) affixed to the first carriage means 40 adjacent guide track 54. The reset slide 180 includes a pair of bar members 180ᵃ and 180ᵇ interconnected adjacent the ends by arm means 179 and a reset lug 184, respectively. In operation, when the line return drive motor 72 is actuated, the cam wheel 177 will be rotated to move the crank arm 178 and actuate the reset slide 180 to the right as viewed in FIGURE 9. The reset lug 184 will engage the leading edge of the rack 170 and cause the rack to be moved to the right as viewed in FIGURE 9, thereby moving carriage 42 to its starting position.

It will be understood that at the beginning of the return or resetting movement of the reset slide 180, the roller 186, which is normally in the recess 187 in one of the bar members of the reset slide, will ride up the incline out of the recess 187. The pawl lift member 188 upon which the roller 186 is journalled will be raised. The projection on the pawl lift member 188 will lift the pawl 167 from engagement with the rack teeth 169 and thereby permit the return of the carriage means 42 to its starting position without damage to the pawl 167 or the teeth 169 on rack 170.

Mounted on the line return motor drive bracket 190 adjacent to the periphery of the cam wheel 177 are switches 191 and 385, which are adapted to be actuated by a cam lug 192 affixed on the wheel 177. The switch 191 is adapted to terminate operation of the line return motor 72 at the end of a cycle of operation and switch 383 energizes a multiple print counter in the electrical circuit as will be more clearly set forth hereafter.

Cam 192 engages an arm of switch 411 for de-energizing the line return motor at the end of 180° rotation of cam 192 to hold the negative in locked position.

It is to be noted that the crank arm 178 is constructed in a manner similar to the crank arm 136 of the frame reset linkage. The crank arm 178 comprises a first arm portion 178ᵃ pivotably affixed at one end to the cam wheel 177 and a second portion 178ᵇ which is pivotally affixed at its far end to the arm 179 of the reset slide 180. The two portions of the crank arm 178 are telescopically and adjustably connected by the joint member 178ᶜ. Spring 194 urges the telescoping portions toward one another in order to maintain the operative engagement of the sections of the arm 178.

Figure 11:
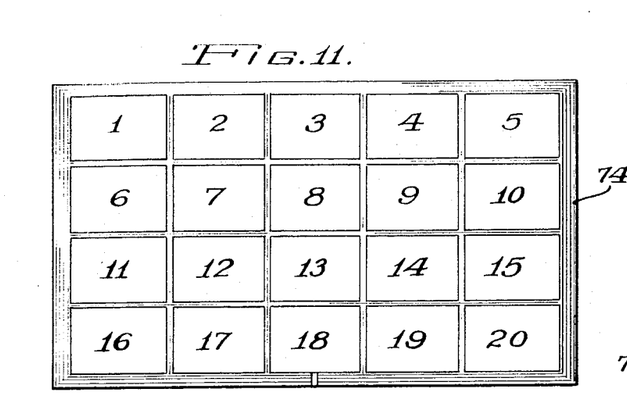
FIGURE 11 is an illustration of a microfiche containing twenty frames which may be utilized with the microphotographic enlarger of the present invention.
Figures 12, 14:
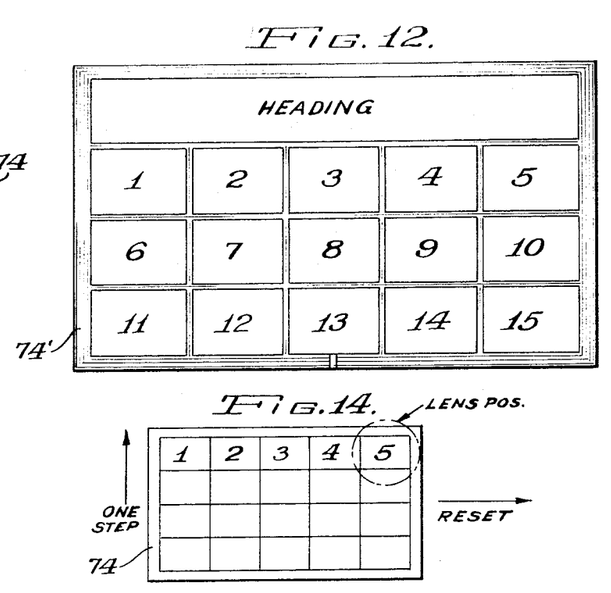
FIGURE 12 is an illustration of a typical microfiche having a heading and fifteen frames.
FIGURES 13 through 16 illustrate schematically the sequential exposure of a microfiche to produce the desired enlargements on a strip of sensitized photographic paper.

FIGURES 11 and 12 illustrate typical microfiches which may be utilized with the present invention. For example, in FIGURE 11, there is illustrated a microfiche having four rows of five frames each. Ordinarily, such microfiche would be on the order of three inches by five inches. It will be understood that different formats of negatives can be used with the enlarging machine of this invention, for example, a four by six inch microfiche having five rows of six frames each may be used or a five by eight microfiche having six rows of eight frames each may be employed.

Figures 13, 15:
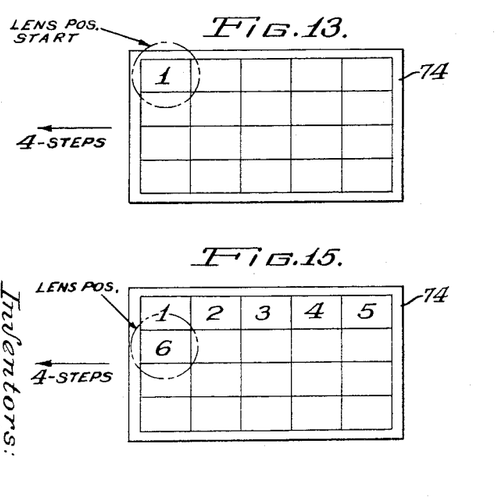
Figure 16:
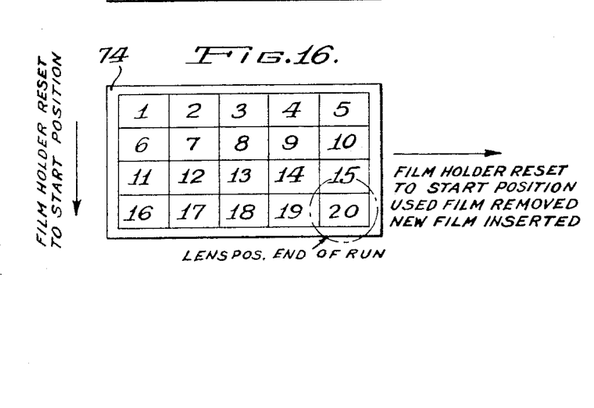

Referring now to FIGURES 13–16, there is illustrated schematically the position of the microfiche with respect to the print lamp in order to sequentially enlarge each of the frames on the selected microfiche. In FIGURE 13, there is illustrated a position of the microfiche 74 with respect to the lens 20. As the first shutter operation is completed, the frame advance drive motor 66 is actuated to index or move the carriage means 40 one increment to the right to prepare the microfiche for the enlargement of frame No. 2. The paper 29 will be advanced. When the carriage means is properly indexed, the shutter will again be actuated to expose frame No. 2 on the new working surface of paper 29. The incremental movement of the carriage means 40, the advance of the paper, and the actuation of the shutter will be repeated until the fifth frame has been exposed, as seen in FIGURE 14. At the conclusion of the fifth exposure, the frame return drive motor 68 is actuated to reset the positon of the microfiche with respect to the lens mechanism 20.

At the end of the frame reset operation, the transverse indexing drive motor or the line advance drive motor 70 is actuated to step up the microfiche holder 16 and the microfiche 74 carried therewith. The microfiche 74 is positioned so as to align frame No. 6 with the aperture opening 92 in base 13 and with the lens mechanism 20 (FIGURE 15). The microfiche will then be indexed or or moved incrementally along the second line to make exposures 7, 8, 9 and 10.

At the completion of the second line of frames, the frame return drive motor 72 will be actuated to reset the microfiche 74. Then the carriage means 42 will be actuated to step up the microfiche to the third line position. This operation will continue until the twenty frames indicated on FIGURE 16 have been exposed and the enlargements made upon the sheet 29. The microfiche 74 which has had each frame enlarged may then be removed and a new microfiche inserted in its place on the microfiche support panel 16.

When a microfiche having a heading thereon, as seen, for example, in FIGURE 12, is to be exposed and enlarged, then the negative or microfiche is moved up in the holder, as the first line of microtext is always in the same place in the negative holder. The enlarging apparatus is programmed to photograph and enlarge with the first line of microtext on the first line. In the case of a three inch by five inch negative having a full heading with three lines of microtext, the apparatus would be programmed to stop at the end of the third line on the program folder.

Figure 17:
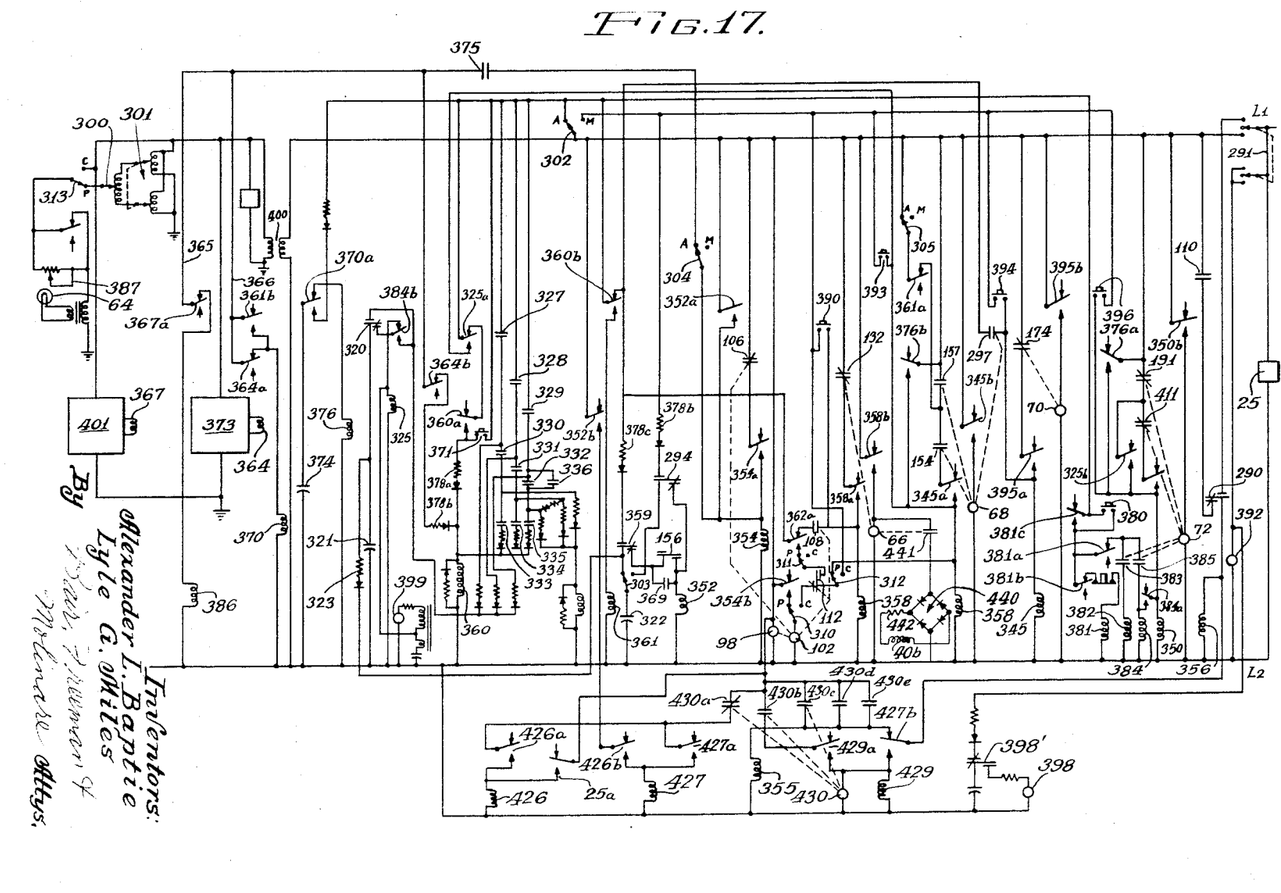
FIGURE 17 is a schematic wiring diagram of the microphotographic enlarging apparatus of the present invention.

Referring now to FIGURE 17, there is illustrated schematically the electrical circuity for the step and repeat enlarging mechanism of the present invention. Paper from the supply roll may be trained over the idler rollers. Paper feed switch 291 is actuated so that the switch arms engage the L contacts, thereby energizing the paper advance motor 292. Upon closure of switch 290, paper advance solenoid 355 will be energized to incrementally advance the paper. The exposure is varied by changing the voltage to the printing lamp 64 and by so changing the exposure, the brightness may be controlled. The exposure time is fixed by a rotary shutter operated at a fixed speed within the print lamp means 18. The voltage range (and therefore the lamp brightness) of the variable transformer 300 (which is located on the front panel) can be changed by adjusting a dual variable transformer 301 at the rear of the enlarging machine. This arrangement gives a vernier effect to the transformer 300 and also enables several machines in a system to give the same exposure with the same front control setting.

An automatic-manual switch having contacts 302, 303, 304 and 305 is provided to permit manually positioning of the microfiche and to make individual exposures with separate push buttons. A print-compose switch having contacts 310, 311, 312 and 313 is provided to check the position and correct focus of the image on the copy paper 29. In compose position C, the switch opens the shutter and keeps it open and puts full voltage upon the printing lamp or exposure lamp 64. When the print-compose switch is returned to print position P, the shutter closes.

At the completion of exposure of a negative or microfiche, both the line return motor 72 and the frame return motor 68 operate but stop at a half-turned positon so that the negative holding mechanism is locked in the normal first frame position as seen in FIGURE 13. This is the normal position before a new negative can be exposed and enlarged.

After the negative holding means 16 (with the negative in place) is placed in the machine and the coded negative folder is placed in positon under the photocells 41 (FIGURE 2) in the control apparatus, the start button 320 is pressed. When the start button is pressed, capacitor 321 is charged. Capacitor 322 is also charged through diode 323 in case the capacitor is not holding a charge from previous operation. When the start button 320 is released, capacitor 321 discharges through control relay 325. A signal lamp (not shown) connected across the coil of control relay 325 exposes a mark at the top of the first page on the enlarged copy to provide an automatic sort mark when the roll of paper 29 is cut into pages at a later time.

The machine will not start without a negative holder in place because one of the switches 327, 328 or 329 must be closed to complete the start circuit. In the present design, the three by five inch negative holder operates switch 327 and sets up the machine to move the negative through five frames on each of four lines. The four by six inch negative holder operates switch 328 and sets up the machine to move the negative through six frames on each of five lines. The five by eight inch negative holder operates switch 329 and sets up the machine to move the negative through eight frames on each of six lines. It will be understood that other formats can be made by changing the position of switches 330–336, respectively. In one form of the present invention, switch 330 closes at frame No. 5 position, switch 331 closes at frame No. 6 position, switch 336 closes at frame No. 7 position, switch 332 closes at frame No. 8 position, switch 333 closes at line No. 4 position, switch 334 closes at line No. 5 position and switch 335 closes at line No. 6 position. Thus, it is seen that the machine may be programmed by a pin on the negative holder means 16 which operates one of three switches and by photocells 41 scanning a marked or coded folder in holder 39 (FIGURE 1).

The control relay 325 holds in for approximately one-half second. The normally closed contact 325$^a$ is moved from the position shown (releasing the stop holding relay circuit) to a lowermost position completing the circuit from lines 340 and 341 to the control relay 345. Upon energization of the control relay 345, the contacts 345$^a$ and 345$^b$ will be closed to energize the frame return motor 68. The frame return motor is kept running until a cam 192 operated by the motor opens switch 154 at the end of a cycle to release the holding circuit of contact relay 345. As contact 325$^b$ is closed, the control relay 350 is energized to control the line return motor 72. Upon energization of control relay 350, the contacts 350$^a$ and 350$^b$ are closed. Closure of contact 350$^b$ will complete a circuit to the line return motor 72. This motor will continue to run until switch 191 and its contacts 191$^a$ and 191$^b$ are opened by cam 192 and the holding circuit of contact relay 350 is released.

The operation of the frame return motor 68 and the line return motor 72 at this time unlocks the negative or microfiche holding mechanism so that the advance motors can move the holding mechanism 16 to succeeding frames.

As the frame return motor 68 reaches about the 270° point, the contacts of switch 156 close, energizing control relay 352 from energy stored in capacitor 322. Contacts 352$^b$ operate a neon lamp 398 which prints a mark on the bottom of the page for later photocell pickup. Contact 352$^a$ energizes control relay 354 which is in the shutter control circuit. Contact 354$^a$ of the control relay 354 forms a holding circuit with switch 106 which is opened by the shutter cam 105 at the end of each cycle of operation. Contact 354$^b$ operates the shutter motor clutch 102. The shutter motor 98 itself runs continuously while the enlarging machine is on.

The shutter cam 105 operates not only switch 106 but also the following switches: switch 108, which starts the frame advance motor through contact relay 358, except at the end of a line or negative; shutter cam operated switch 110, which energizes the paper advance solenoid 355 and the production counter 356 through the normally closed contact of manual paper advance switch 290; and switch 112, which starts the frame return motor 68 when this exposure is the last of a given line.

The frame advance motor 66 is kept on for one cycle by the holding circuit of contact relay 358 and switch 132. The frame return motor 68 is kept on for one cycle by the holding circuit of contact 345a and switch 154. (Switch 157 is bypassed by contact 360$^a$ and has no effect except at the end of a negative.)

While the paper is advancing, the contacts of switch 359 are in position to charge capacitor 322. When the paper advance is finished, switch 359 discharges the capacitor through control relay 352, which then starts the shutter motor cam movement again through control relay 354.

During operation of the frame return motor 68, switch 297 will be closed. If the normally open contact of switch 359 is closed at the same time switch 297 is closed, a circuit will be completed for energizing relay 395 and therefore energizing line advance motor 70.

If the frame return motor 68 has started because the last exposure was the last one on the line, switch 369 will be open and control relay 352 will not be energized until the frame return cam 152 closes switch 156. If the last exposure was the last one of the negative, then control relay contact 360$^b$ will have opened and the capacitor 322 will not charge and so control relay 352 will not be energized by the closure of switch 359. The last frame of a line is detected by switch 330, 331 or 332, depending upon which switch 327, 328 or 329 was closed by the negative holder support means 16. Switches 330, 331 and 332 are operated by a linear cam that moves with the negative holder carriage. When the last frame position is reached, control relay 362 is energized, and contact 362$^a$ opens the circuit to the shutter-operated switch 108 and closes the circuit to switch 112. Thus, the frame return motor 68 is started instead of the frame advance motor 66.

The enlarging machine stops automatic printing operation under the following three conditions: (1) when stop-push button 371 is pressed, (2) when the position of the last possible frame is reached, that is, the last frame of the last line, and (3) when the stop photocell in the stop photocell circuit 373 detects an indicia mark on the program folder.

The stop photocell circuit designated schematically by numeral 373 in FIGURE 17 consists of a semiconductor photocell, a transistor amplifier and a thyratron power amplifier to operate control relay 364. Control relay 364 is normally held energized except when the photocell is over a black mark.

The lines 365 and 366 that connect contact 367a, 360b and 364a are energized from the time the shutter cam starts movement until switch 110 operates the paper advance cam which opens switch 375.

If the photocell is over a black spot while this line is energized, control relay 370 will be energized through contact 364a. During this time, contact 370a charges capacitor 374. When the line is de-energized, contact 370a discharges the capacitor through control relay 376 which holds in about three-quarters of a second. Contact 376a is closed to start the line return motor 72. Contact 376b is closed to start the frame return motor 68.

Control relay 360 is energized by closure of contact 364b through diode 378b if the photocell is over a black spot when the shutter starts. Control relay 360 is kept engaged by a holding circuit through contacts 325a and 360a and diode 378a. Control relay 360 can also be operated by the last frame position of the negative or microfiche or by the manual stop-push button 371.

The frame return motor 68 and the line return motor 72 both stop at the half-turn position to lock the negative holder in starting position.

Contact 360b removes the voltage source of contact 362a so that neither the frame advance motor 66 nor the frame return motor 68 are started by actuation of the shutter cam. Contact relay 360 is energized by the closure of the normally open contact 360b and in effect gives extra contacts to control relay 360. Contact 361a opens, so that switch 157 will shut off the frame return motor 68 at one-half cycle position. Contact 361b operates control relay 370 and thus controls relay 376 to start the two return motors.

When multiple copies of a negative are desired, the machine can be programmed to make up to eighty copies. The multiple print counter on the control panel on the front of the machine is set to the desired number and the multiple print counter push button 380 is pressed. This energizes the clutch coil 381 of the multiple print counter which is then held in by contacts 381c until the predetermined count is reached. As the line return motor 72 runs (at the end of a negative), switch 383 is first tripped to activate the count coil 382. Switch 385 is then tripped by the line return motor 72 and if the count has not been reached, contact relay 384 is energized. Contact 381a and switch 385 form a holding circuit that keeps control relay 384 energized until the line return motor 72 stops at the halfway point. Contact 384b is in the start circuit and electrically gives the same results as pushing the start button 320. When the multiple print counter reaches the desired count, contact 381b opens, deenergizing clutch coil 381, thereby opening contact 381c. Since there is no voltage at switch 385 to energize control relay 384, the action of the multiple print counter is stopped.

It has been found that continuous tone material reproduces better if the voltage is reduced on the printing lamp. This reduction in voltage can be programmed into the enlarging machine of this invention by placing a black mark in the upper left-hand corner of a frame on the program folder. When a second photocell is over this mark, control relay 367 is de-energized through down voltage photocell circuit 401 and control relay 386 is energized during the first part of the shutter cam operation. Energization of control relay 386 opens the contact 386a and places a variable resistor 387 in the circuit to the printing lamp 64, thereby reducing lamp brightness during exposure.

After each of the frames on the microfiche being retained by the holder 16 has been exposed and enlarged upon the paper maintained in position within cabinet 26, the hold-down bolt may be loosened and the holder may be removed. A new microfiche may then be retained in the holder and the machine can then be readied for exposure of the second microfiche.

For manual operation, the switches 302, 303, 304 and 305 engage the contacts M. The manual exposure push button 294 is pressed to expose an image or frame on the microfiche. Upon actuation of the push button 390, a circuit will be completed, energizing control relay 358 and closing contacts 358a and 358b. When contact 358b closes, the frame advance motor 66 will be energized. This sequence may be repeated until five frames have been exposed.

Upon closure of push button 393, contact relay 345 will be energized, closing contact 345b to energize the frame return motor 68. Thus, the microfiche holder will be reset to the first column position. To advance a line, push button 394 is actuated to energize contact relay 395. Upon closure of contact 395b, a circuit is completed across the line advance motor 70, thereby energizing the line advance motor and advancing the microfiche holder to align the next line over the aperture opening 92 in the base 13. When the push button 396 is actuated, contact relay 350 will be energized, thereby closing contacts 350a and 350b and actuating the line return motor 72 to reset the microfiche holder.

A cut marker 398 and a sort marker 399 may be provided in the electrical circuit to make appropriate marks on the print paper to facilitate sorting and cutting of the roll after the print paper 29 has been developed in a separate printing operation.

The cut mark light 398 is energized after the end of the paper advance. Switch 398' is actuated by a pin on the paper advance cam driven by paper advance motor 392 in the normal stopped position of the cam. The clutching action is such that the paper is stopped shortly before the mark is exposed.

The sort marker light 399 is provided with a trigger circuit including a transformer and a capacitor for providing a high voltage pulse to fire the neon light. Such trigger circuit may be necessary when there is inadequate voltage across relay 376 to fire the neon light when it is in the dark.

The power supply for the photocell circuits may be derived from a transformer 400 which is disposed across the line.

The enlarging device of the present invention is provided with a splice detector 25 to prevent ruining exposures due to splices in the paper. Splices are ordinarily made with a metalized tape and when detected are advanced through the machine without printing. Because the splice also will cause the paper cutter to operate in a later process, a blank must be made in the frame ahead of the splice. The circuitry for accomplishing this includes the splice detector 25, relays 426, 427 and 429, and programmer 430.

When a splice passes the detector sensing unit 25, the "plus" relay in the detector sensing unit closes contact 25a momentarily, energizing relay 426, which is held in by contact 426a. If contacts 426b are closed when an exposure is started, relay 427 will be energized and held by contacts 427a. Except when a splice has been detected, the paper advance solenoid 355 is connected to switch 110 through the normally closed contacts of 427b. When a splice is detected, relay 429 and programmer motor 430 are energized by switch 110 through the normally open contacts of 427b. Contacts 430a keep the programmer 430 on for one cycle. Contacts 430b, 430c, and 430d make three separate paper advances—one for the last exposure made, one for a blank ahead of the splice, and one for the frame with the splice. Contact 430a opens momentarily to release relays 426 and 427. Contacts 429a keep the enlarging machine from making prints until this operation is complete.

The brake mechanism for stopping the carriage 42 at the end of each frame advance includes a brake coil 40b disposed for operative engagement with brake band 40a (FIGURE 2). The brake coil is in circuit with a bridge rectifier 440, a switch 441 operatively connected for actuation by rotation of frame advance motor 66, and a dropping resistor 442 located between the bride rectifier and the brake coil.

The present invention provides a novel step and repeat enlarging mechanism capable of enlarging a plurality of frames from a microfiche on a panel of photosensitive film in a pre-arranged pattern. The enlarging mechanism can easily be adapted to utilize microfiches of different size, as well as microfiches having a heading strip or title strip at the top thereof.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new, and desire to secure by Letters Patent of the United States, is:

1. A machine for enlarging and printing individual frames in a preselected sequence from a microfiche containing a plurality of frames in a prearranged pattern comprising, in combination; frame means, means on said frame means for supporting sensitized paper upon which the enlarged frames are to be sequentially exposed at a print station, enlarging lens mechanism supported on said frame means in spaced relationship to the working surface of said sensitized paper, lamp means on said frame means for illuminating and exposing a preselected frame from said microfiche on said sensitized paper, holder means for supporting a microfiche for movement between said lamp means and said lens mechanism, and carriage means for supporting said holder means for movement in a plane parallel to the plane of the working surface of said sensitized paper, said carriage means comprising a first carriage assembly movable linearly with respect to said working surface, and a second carriage assembly movable linearly and transversely with respect to said working surface and in a predetermined sequence with respect to movement of said first carriage assembly, power means for moving each of said carriage assemblies comprising a first drive mechanism for said first carriage assembly including a frame advance drive motor operatively connected to said first carriage assembly, a frame return drive motor operatively connected to said first carriage assembly, and a second drive mechanism for said second carriage assembly including a line advance drive motor operatively connected to said second carriage assembly and a line return drive motor operatively connected to said second carriage assembly, and drive means coordinated with movement of said carriage means and exposure of an enlarged image on said sensitized paper for moving an unexposed working surface of said sensitized paper into position at said print station.

2. A microphotographic enlarging machine for enlarging and printing individual frames from a microfiche having a plurality of frames arranged thereon in a predetermined pattern, comprising, in combination, frame structure, means for supporting print paper at a print station in a first plane on said frame structure, holder means for supporting said microfiche in a second plane parallel to said first plane, enlarging lens means carried on said frame structure in alignment with an aperture opening therein, print lamp means on said frame structure in alignment with and spaced from said aperture opening so as to permit movement of said microfiche between said print lamp means and said aperture opening, first carriage means for supporting said holder means for longitudinal movement in said second plane, second carriage means on said first carriage means for supporting said holder means for transverse movement in said second plane, first indexing means for advancing said first carriage means incrementally, including an advance motor, first return means for resetting the first carriage means including a return drive motor, second indexing means for advancing said second carriage means incrementally in response to predetermined movement of said first carriage means including an advance motor, second return means for resetting the second carriage means including a return drive motor, and means for moving said print paper incrementally after an enlarged image has been exposed thereon.

3. A microphotographic enlarging machine for enlarging and printing individual frames from a microphotographic negative having a plurality of frames arranged thereon in a predetermined pattern, comprising in combination, frame structure, means for supporting print paper at a print station in a first plane on said frame structure, holder means for supporting said negative in a plane, enlarging lens means carried on said frame structure in alignment with an aperture opening therein, said enlarging lens means including a movable shutter in the lens means and power means for actuating such movable shutter, print lamp means on said frame structure in alignment with and spaced from said aperture opening so as to permit movement of the negative between said print lamp means and said aperture opening, first carriage means for supporting said holder means for longitudinal movement in a second plane parallel to said first plane of said print paper, second carriage means on said first carriage means for supporting said holder means for transverse movement in said second plane, first indexing means for advancing said first carriage means incrementally, including an advance motor, first cam means operatively connected to the advance motor, and pawl and ratchet means connecting the first cam means and the first carriage means, first means for returning said first carriage means to its initial position at the end of a predetermined sequence of operation, second indexing means for advancing said second carriage means incrementally in response to predetermined movement of said first carriage means including an advance motor, second cam means operatively connected to the advance motor, and pawl and ratchet means connecting the second cam means and the second carriage means, means for returning said second carriage means to its initial position, power means for moving each of said carriage assemblies comprising a first drive mechanism for said first carriage assembly including a frame advance drive motor operatively connected to said first carriage assembly, a frame return drive motor operatively connected to said first carriage assembly, and a second drive mechanism for said second carriage assembly including a line advance drive motor operatively connected to said second carriage assembly and a line return drive motor operatively connected to said second carriage assembly, and means for moving said print paper incrementally after an enlarged image has been exposed thereon subsequent to actuation of said movable shutter.

4. A microphotographic enlarging machine for enlarging and printing individual frames from a microphotographic negative having a plurality of frames arranged thereon in a predetermined pattern, comprising, in combination, frame structure, means for supporting sensitized print paper at a print station in a first plane on the frame structure, holder means for supporting said negative in a plane, enlarging lens means carried on the frame structure in alignment with an aperture opening therein, print lamp means on said frame structure in alignment with and spaced from said aperture opening so as to permit movement of said negative between said print lamp means and said aperture opening, first carriage means reciprocable in a plane parallel to and spaced from said first plane, second carriage means on said first carriage means supporting said holder means for transverse movement in a plane parallel to said first plane, frame drive means for actuating said first carriage means incrementally in a first direction including a frame drive motor, a first cam wheel operatively connected to said frame drive motor, pawl and ratchet means connecting said first cam wheel to said first carriage means, frame return drive means for resetting said first carriage means including a frame return motor, and a cam wheel, crank arm and reset slide operatively connecting the frame return motor to the first carriage means, line drive means for actuating said second carriage means incrementally in response to predetermined movement of said first carriage means including a line advance motor, a second cam wheel operatively connected to said line advance motor, pawl and ratchet means connecting said second cam wheel to said second carriage means, line return drive means for resetting said second carriage means including a line return motor, and a cam wheel, crank arm and reset slide operatively connecting the line return motor to the second carriage means, and means for moving said print paper incrementally passed said print station after a frame on said negative has been exposed.

5. A microphotographic enlarging device comprising, in combination, frame structure, means on said frame structure for supporting print paper at a print station in a first plane, holder means for a supporting a microfiche having a plurality of frames arranged thereon in a predetermined pattern in a plane, enlarging lens means carried on said frame structure in alignment with an aperture opening therein, said lens means including a movable shutter actuated by power means, print lamp means on said frame structure in alignment with and spaced from said aperture opening so as to permit movement of said microfiche between said print lamp means and said aperture opening, carriage means for supporting said microfiche holder means for movement in a predetermined plane parallel to said plane of said print paper and spaced therefrom, said carriage means comprising a first carriage assembly movable longitudinally with respect to the print station, a second carriage assembly movable transversely on said first carriage assembly in a predetermined sequence with respect to movement of said first carriage assembly, said first carriage assembly being supported and guided for movement on said frame structure on means comprising a first guide track extending longitudinally of the print station and first roller means disposed longitudinally of the print station, said second carriage assembly being supported and guided on a second guide track affixed to said second carriage assembly along one side thereof and disposed perpendicularly with respect to said first guide track and second roller means operatively associated with an opposite side of said second carriage assembly and disposed perpendicularly with respect to said first roller means, means for actuating the first and second carriage assemblies in a predetermined sequence so as to expose each of the frames on the microfiche in a predetermined order, said actuating means including a frame advance motor, a first cam wheel operatively connected to the frame advance motor, pawl and ratchet means connecting the first cam wheel and the first carriage assembly, a frame return drive motor for resetting the first carriage assembly, a line advance motor, a second cam wheel operatively connected to the line advance motor, pawl and ratchet means connecting the second cam wheel and the second carriage assembly, a line return drive motor for resetting the second carriage assembly, said shutter being actuated sequentially to expose the enlarged image on the print paper, and means for advancing the print paper incrementally after an enlarged image has been exposed thereon.

6. A machine for enlarging and printing out frames from a microfiche containing thereon a plurality of frames in prearranged lines and columns onto sensitized paper in a predetermined sequence comprising, frame means, carriage means supporting said microfiche for movement transversely and longitudinally in a selected plane on said frame means, a printing lamp carried on said frame means adjacent to said carriage means for lighting a preselected frame, lens means on said frame means for enlarging said preselected frame, a supply of sensitized paper movable passed a print station spaced from said lens means, said carriage means comprising a first carriage, means on said frame means for guiding said first carriage for movement longitudinally on said frame means, a second carriage, means on said first carriage for guiding said second carriage transversely on the path of movement of said first carriage, first drive means for sequentially moving said carriage means longitudinally with respect to said sensitized paper to orient a frame in a line on said microfiche between said printing lamp and said lens means, said first drive means including a frame advance motor, a first cam means driven by said advance motor, pawl and ratchet means connecting said first cam means and said first carriage, a frame return drive motor for returning the first carriage, a cam wheel operatively connected to the return drive motor, reset slide means operatively connecting the cam wheel to the first carriage, second drive means for sequentially moving said carriage means transversely with respect to said sensitized paper to orient the frames in another line on said microfiche between said printing lamp and said lens means, said second drive means including a line advance motor, a second cam means driven by said line advance motor, pawl and ratchet means connecting said second cam means and said second carriage, a line return drive motor for returning said second carriage, a cam wheel operatively connected to the line return drive motor, reset slide means operatively connecting the cam wheel to the second carriage, switch means for programming the sequential operation of said carriage means responsive to actuation by the cam means and cam wheels respectively, means for energizing said printing light automatically to expose preselected frames of said microfiche, and paper advancing means for sequentially moving the supply of sensitized paper passed the print station after an enlarged frame has been exposed on said sensitized paper.

7. A machine for enlarging and printing individual frames in a preselected sequence from a microfiche containing a plurality of frames in a prearranged pattern comprising, in combination; frame means, means on said frame means for supporting a supply of sensitized paper upon which the enlarged frames are to be sequentially exposed at a print station, enlarging lens mechanism supported on said frame means in spaced relationship to the working surface of said sensitized paper, lamp means on said frame means for illuminating and exposing a preselected frame from said microfiche on said sensitized paper, holder means for supporting a microfiche for movement between said lamp means and said lens mechanism, and carriage means for supporting said holder means for movement in a plane parallel to the plane of the working surface of said sensitized paper, said carriage means comprising a first carriage assembly movable linearly in a plane substantially parallel to the plane of said working surface, and a second carriage assembly movable linearly in a plane substantially parallel to the plane of said working surface and movable transversely of said first carriage assembly and in a predetermined sequence with respect to movement of said first carriage assembly, actuating means for said carriage means including a frame advance motor, a first cam wheel operatively connected to the frame advance motor, pawl and ratchet means connecting the first cam wheel and the first carriage assembly, a frame return drive motor for resetting the first carriage assembly, a line advance motor, a second cam wheel operatively connected to the line advance motor, pawl and ratchet means connecting the second cam wheel and the second carriage assembly, a line return drive motor for resetting the second carriage assembly, drive means coordinated with movement of said carriage means and exposure of an enlarged image on said sensitized paper for moving an unexposed working surface of said sensitized paper into position at said print station, and splice detector means for automatically detecting a splice in the supply of sensitized paper and for advancing the sensitized paper while preventing printing of an enlargement thereon.

References Cited by the Examiner

UNITED STATES PATENTS 2,986,967 6/1961 Albert et al. _________ 88—24
3,094,036 6/1963 Benson _____________ 88—24

NORTON ANSHER, Primary Examiner.

R. A. WINTERCORN, Assistant Examiner.